US011990723B2

(12) United States Patent
Jushchyshyn et al.

(10) Patent No.: US 11,990,723 B2
(45) Date of Patent: May 21, 2024

(54) CONDUCTOR INTERFACE GRABBING TOOL

(71) Applicant: Burndy, LLC, Manchester, NH (US)

(72) Inventors: Jeremy Jushchyshyn, Willow Grove, PA (US); Andison Fernandez, Pennsauken, NJ (US); Patrick J. Shay, Cinnaminson, NJ (US)

(73) Assignee: BURNDY, LLC, Manchester, NH (US)

( * ) Notice: Subject to any disclaimer, the term of this patent is extended or adjusted under 35 U.S.C. 154(b) by 258 days.

(21) Appl. No.: 17/195,991

(22) Filed: Mar. 9, 2021

(65) Prior Publication Data

US 2021/0281035 A1 Sep. 9, 2021

Related U.S. Application Data

(60) Provisional application No. 62/987,109, filed on Mar. 9, 2020.

(51) Int. Cl.
*H01R 43/22* (2006.01)

(52) U.S. Cl.
CPC .................................... *H01R 43/22* (2013.01)

(58) Field of Classification Search
CPC ......... H01R 43/22; H01R 11/15; H01R 43/04
See application file for complete search history.

(56) References Cited

U.S. PATENT DOCUMENTS 1,603,035 A * 10/1926 Evans
1,741,970 A * 12/1929 Bodendieck ........... H01R 11/15 81/3.8
2,196,964 A * 4/1940 Lee ........................ H01R 11/15 439/416
3,135,310 A * 6/1964 Stoltz ................. H01R 43/0424 72/402
3,251,216 A * 5/1966 Broske .................... B30B 1/005 72/470
3,544,956 A * 12/1970 Bricker, Jr. ............ H01R 11/15 174/71 R
3,660,883 A * 5/1972 Hoeckele ........... H01R 43/0427 72/20.2
4,133,591 A * 1/1979 West ...................... H01R 11/15 439/480
4,192,171 A * 3/1980 Hamilton ............. H01R 43/042 72/454
4,248,161 A 2/1981 Adair
5,286,211 A * 2/1994 McIntosh ............... H01R 11/15 269/87.3

(Continued)

*Primary Examiner* — Peter Dungba Vo
*Assistant Examiner* — Jose K Abraham
(74) *Attorney, Agent, or Firm* — Wissing Miller LLP

(57) ABSTRACT

The present disclosure provides a tool that grips a conductor interface of a wedge type electrical connector so that the conductor interface can be installed between a main conductor and a tap conductor being electrically and mechanically connected by the wedge type electrical connector. The tool includes a body, a carriage adjuster and a gripping carriage. The body has a first arm, a second arm and a back pad between the first arm and the second arm. The carriage adjuster is operatively coupled to the body, and the gripping carriage is coupled to the carriage adjuster. The second arm and the gripping carriage are used to grip the conductor interface in response to the operation of the carriage adjuster.

23 Claims, 13 Drawing Sheets

(56) References Cited

U.S. PATENT DOCUMENTS

| | | | | |
|---|---|---|---|---|
| 5,556,299 | A * | 9/1996 | Finke | H01R 11/15<br>439/803 |
| 7,052,334 | B1 * | 5/2006 | Cabay | F16B 39/04<br>411/326 |
| 8,932,087 | B2 * | 1/2015 | Neal | H01R 11/14<br>439/776 |
| 11,283,203 | B1 * | 3/2022 | Avupati | H02G 1/02 |
| 2006/0148286 | A1 * | 7/2006 | Hughes | H01R 11/14<br>439/92 |
| 2012/0142231 | A1 * | 6/2012 | De France | H01R 11/15<br>439/815 |
| 2013/0303035 | A1 * | 11/2013 | Neal | H01R 11/14<br>439/776 |
| 2018/0031794 | A1 * | 2/2018 | Sakmar | H02G 3/32 |
| 2019/0363462 | A1 * | 11/2019 | O'Connell | H01R 4/66 |

* cited by examiner

CONDUCTOR INTERFACE GRABBING TOOL

CROSS REFERENCE TO RELATED APPLICATIONS

The present disclosure is based on and claims benefit from U.S. Provisional Patent Application Ser. No. 62/987,109 filed on Mar. 9, 2020 entitled "Conductor Interface Grabbing Tool" the contents of which are incorporated herein in its entirety by reference.

BACKGROUND

Field

The present disclosure relates generally to tools for installing electrical connectors. More particularly, the present disclosure relates to a tool that grips an interface of a wedge type electrical connector so that the interface can be installed between main conductors and tap conductors being connected by the wedge type electrical connector.

Description of the Related Art

Wedge type electrical connector assemblies are known in the art. Electrical connectors may be adapted to electrically and mechanically connect conductors within a transmission or distribution circuit. For example, a typical electrical connector may be used to connect a main conductor to a tap conductor. An electrical connector adapted to connect a main conductor or a tap conductor to another conductor may be referred to as a tap connector. Wedge type tap connectors typically include a C-shaped body having a curved top wall adapted to fit over a main conductor. A bolt-operated wedge is carried by the bottom of the C-shaped body and may include an elongated recess in the top for supporting the tap conductor. A conductor interface has a handle thereon which allows the interface to be placed within the C-shaped connector body between the conductors. A bolt positively moves the wedge both in and out of the C-shaped body so that a clamping action of the connector can be tightened or loosened as desired.

Placing the interface within the C-shaped connector body between the conductors may be time consuming during a hot stick installation because current hot sticks do not tightly grip the interface. As a result, the position of the interface relative to the hot stick may easily and unintentionally change which makes it difficult to place the interface between the conductors.

SUMMARY

The present disclosure provides exemplary embodiments of a tool that grips an interface of a wedge type electrical connector so that the interface can be installed between main conductors and tap conductors being connected by the wedge type electrical connector. In an exemplary embodiment, the tool includes a body, a carriage adapter and a gripping carriage. The body has a first arm, a second arm and a back pad between the first arm and the second arm. The first arm has a bore, e.g., a threaded or smooth bore, therethrough and at least one stabilizing leg extending from a bottom surface of the first arm. The second arm has a free end with a tapered surface. The carriage adjuster extends through the bore in the first arm and is movable, e.g., rotatable, relative to the bore. The gripping carriage is coupled to the carriage adjuster such that the carriage adjuster can move the gripping carriage between a loading position and a gripping position. The gripping carriage has a tapered surface having substantially the same taper as the tapered surface of the free end of the second arm.

In another exemplary embodiment, the connector interface gripping tool includes a body, a carriage adjuster and a gripping carriage. The body is a substantially C-shaped body having a body gripping surface. The carriage adjuster has at least a portion extending through the body and is movable relative to the body. The gripping carriage is coupled to the carriage adjuster such that the carriage adjuster can move the gripping carriage between a loading position and a gripping position relative to the body. The gripping carriage has a carriage gripping surface, wherein a shape of the carriage gripping surface is configured to align with a shape of the body gripping surface so that the carriage gripping surface and the body gripping surface can grip and hold an adapter portion of a connector interface.

In another exemplary embodiment, the connector interface gripping tool includes a body, a carriage adjuster and a gripping carriage. The body has a first arm, a second arm and a back pad between the first arm and the second arm. The first arm has a bore therethrough and at least one stabilizing leg extending from a surface of the first arm. The second arm is spaced apart from the first arm and has a free end with a body gripping surface. The carriage adjuster has at least a portion extending through the bore in the first arm and is movable relative to the bore. The gripping carriage is coupled to the carriage adjuster such that the carriage adjuster can move the gripping carriage between a loading position and a gripping position relative to the body. The gripping carriage has a carriage gripping surface, wherein a shape of the carriage gripping surface is configured to align with a shape of the body gripping surface such that the carriage gripping surface and the body gripping surface can grip and hold an adapter portion of a connector interface.

In another exemplary embodiment, the connector interface gripping tool includes a body, a carriage adjuster and a gripping carriage. The body has a back pad, a first arm having a bore therethrough extending from the back pad, and a second arm extending from the back pad in the same direction as the first arm. The second arm is spaced apart from the first arm and has a tapered body gripping surface at a free end of the second arm. The carriage adjuster has at least a portion extending through the bore in the first arm and is movable relative to the first arm. The gripping carriage includes a carriage gripping surface having substantially the same taper as the body gripping surface. The gripping carriage is coupled to the carriage adjuster such that the carriage adjuster can move the gripping carriage between a loading position and a gripping position. When the gripping carriage is in the loading position there is a gap between the carriage gripping surface and the body gripping surface sufficient to permit an adapter portion of a connector interface to be positioned between the carriage gripping surface and the body gripping surface, and when the gripping carriage is in the gripping position the carriage gripping surface and the body gripping surface grip and hold the adapter portion of the connector interface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides exemplary embodiments of an interface gripping tool used to grip a conductor interface of an electrical cable connector so as to steady the conductor interface when installing the conductor interface between main and tap conductors. A conductor interface is a separate component of, for example, a wedge type electrical cable connector. Examples of wedge type electrical cable connectors include wedge type tap connectors that electrically and mechanically connect a main conductor to a tap conductor. The interface gripping tool according to the present disclosure is adapted to grip a conductor interface and to be coupled to an extendable reach tool, such as a hot stick. The interface gripping tool is used to install a conductor interface between a main conductor and a tap conductor positioned within a wedge type electrical cable connector. The extendable reach tool can then be used to raise and manipulate a conductor interface gripped by the interface gripping tool toward an electrical cable connector being connected to a main conductor and a tap conductor. For ease of description, the interface gripping tool contemplated by the present disclosure may also be referred to herein as the "tools" in the plural and the "tool" in the singular. The conductor interfaces referenced herein may also be referred to herein as the "interfaces" in the plural and the "interface" in the singular. The wedge type electrical cable connector referenced herein may also be referred to herein as the "tap connectors" in the plural and the "tap connector" in the singular. The main conductors referenced herein include, for example, transmission line conductors, and the tap conductors referenced herein include, for example, branch and run conductors. For general reference purposes, a main conductor supplies power from either a transmission circuit or a distribution circuit, and a tap conductor distributes power to a distribution circuit or a load.

Figure 3:
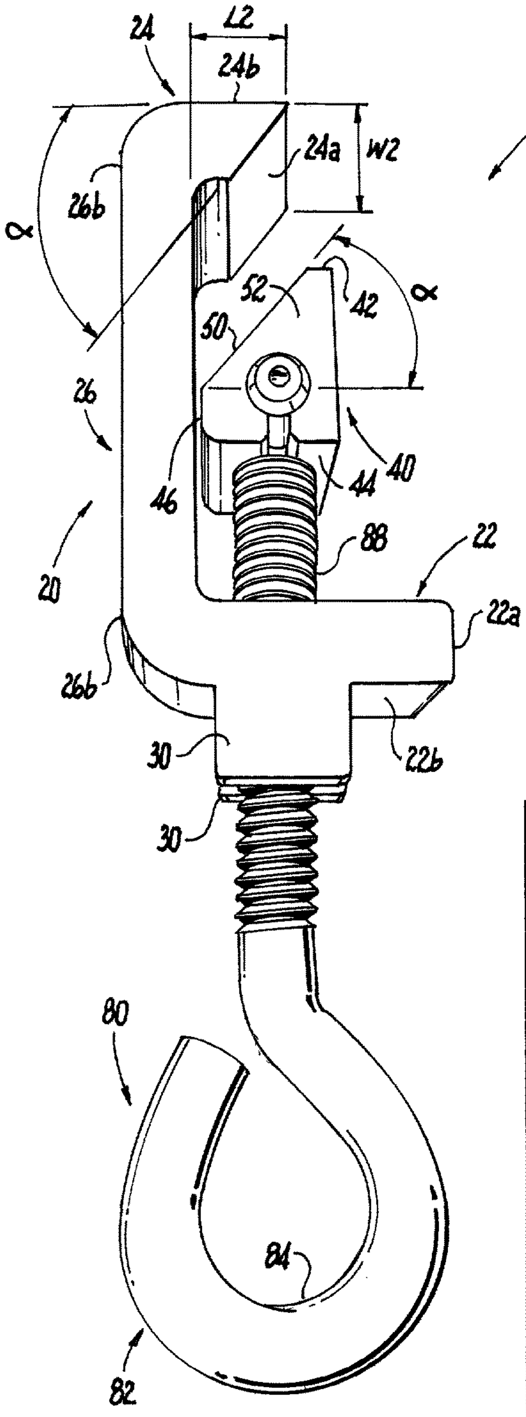
FIG. 3 is a bottom perspective view of the interface gripping tool of FIG. 1, illustrating a tool body and a gripping carriage movably coupled to the tool body.
Figure 4:
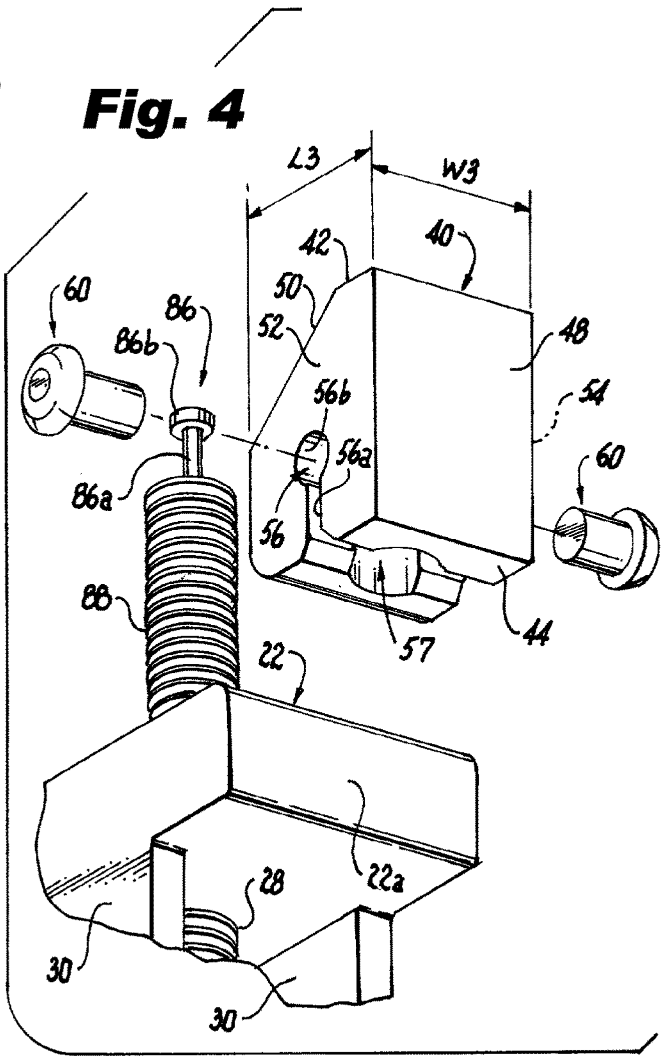
FIG. 4 is an exploded bottom perspective view of a portion of the interface gripping tool of FIG. 3, illustrating the gripping carriage separated from a carriage adjuster.
Figure 5:
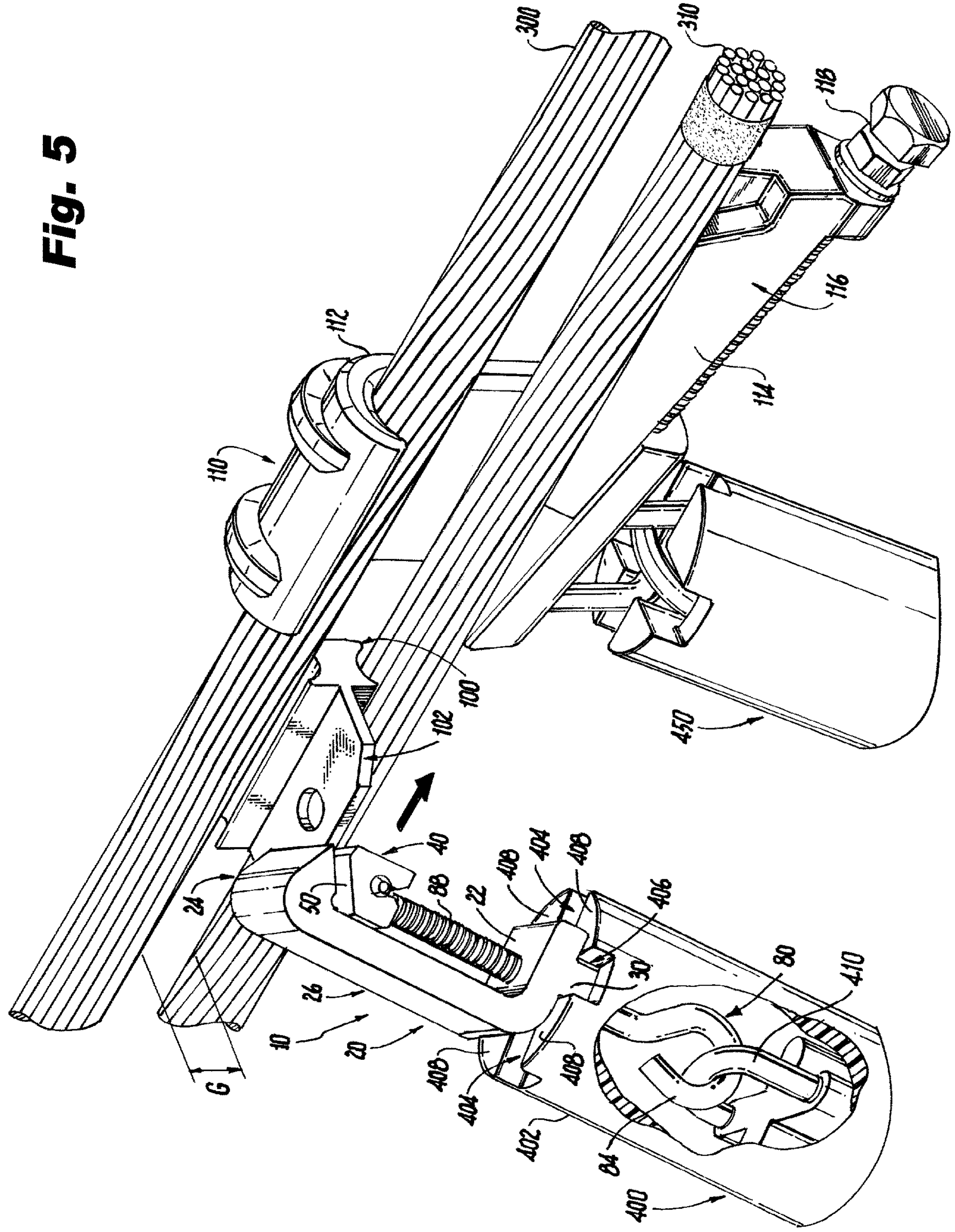
FIG. 5 is a perspective view of the interface gripping tool of FIG. 2 gripping a corner of the adapter portion of the conductor interface and coupled to an extendable reach tool with the conductor interface positioned for insertion between a main conductor and a tap conductor within a wedge type cable connector assembly.
Figure 6:
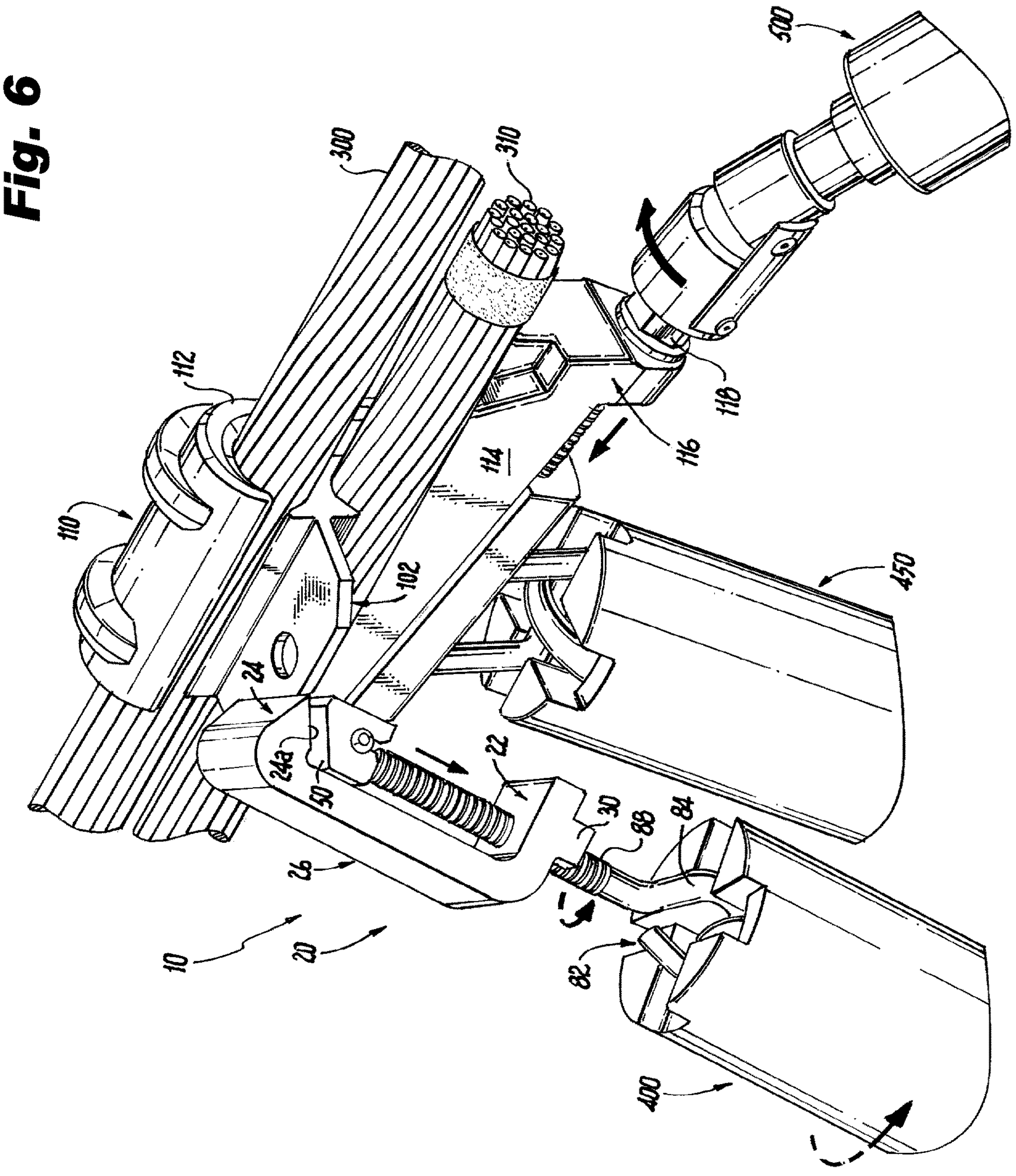
FIG. 6 is a perspective view of the interface gripping tool, extendable reach tool and wedge type cable connector assembly of FIG. 5, with the main conductor, the tap conductor and the conductor interface within the wedge type cable connector assembly, and illustrating the interface gripping tool being removed from the conductor interface.

Referring to FIGS. 1-4, an exemplary embodiment of a tool 10 according to the present disclosure is shown gripping an adapter portion 102 of an interface 100 of a tap connector 110, seen in FIG. 5. The tool 10 includes a body 20, a gripping carriage 40 and carriage adjuster 80. The body 20 may be of unitary or monolithic construction and is preferably formed into a U-shaped like or C-shaped like structure having two arms 22 and 24 joined by a back pad 26. The first arm 22 extends from one end 26*a* of the back pad 26 and ends at a free end 22*a*, and the second arm 24 extends from another end 26*b* of the back pad 26 and ends at a free end 24*a*. In the exemplary embodiment shown, the first arm 22 is a substantially flat member having a length "L1" and a width "W1." The length "L1" of the first arm 22 helps with the attachment of the tool 10 to an extendable reach tool, e.g., a hot stick. The length "L1" may be in the range of about 0.5 inches and about 2 inches. The width "W1" is preferably less than a width "W" of the interface 100. For example, the width "W1" of the first arm 22 may be in the range of about 0.5 inches and about 3 inches. However, the present disclosure contemplates embodiments where the width "W1" of the first arm 22 is greater than or equal to a width "W" of the interface 100. The arm 22 includes a bore 28 therethrough used to couple the carriage adjuster 80 to the body 20. The bore 28 may be a threaded bore or a smooth bore. In the exemplary embodiment shown, the bore 28 is a threaded bore. Extending from a bottom surface 22*b* of the first arm 22 is one or more stabilizing legs 30. The stabilizing legs 30 are provided to interact with a head portion of an extendable reach tool 400, e.g., a hot stick, as shown in FIGS. 5 and 6 and described in more detail below.

Figure 1:
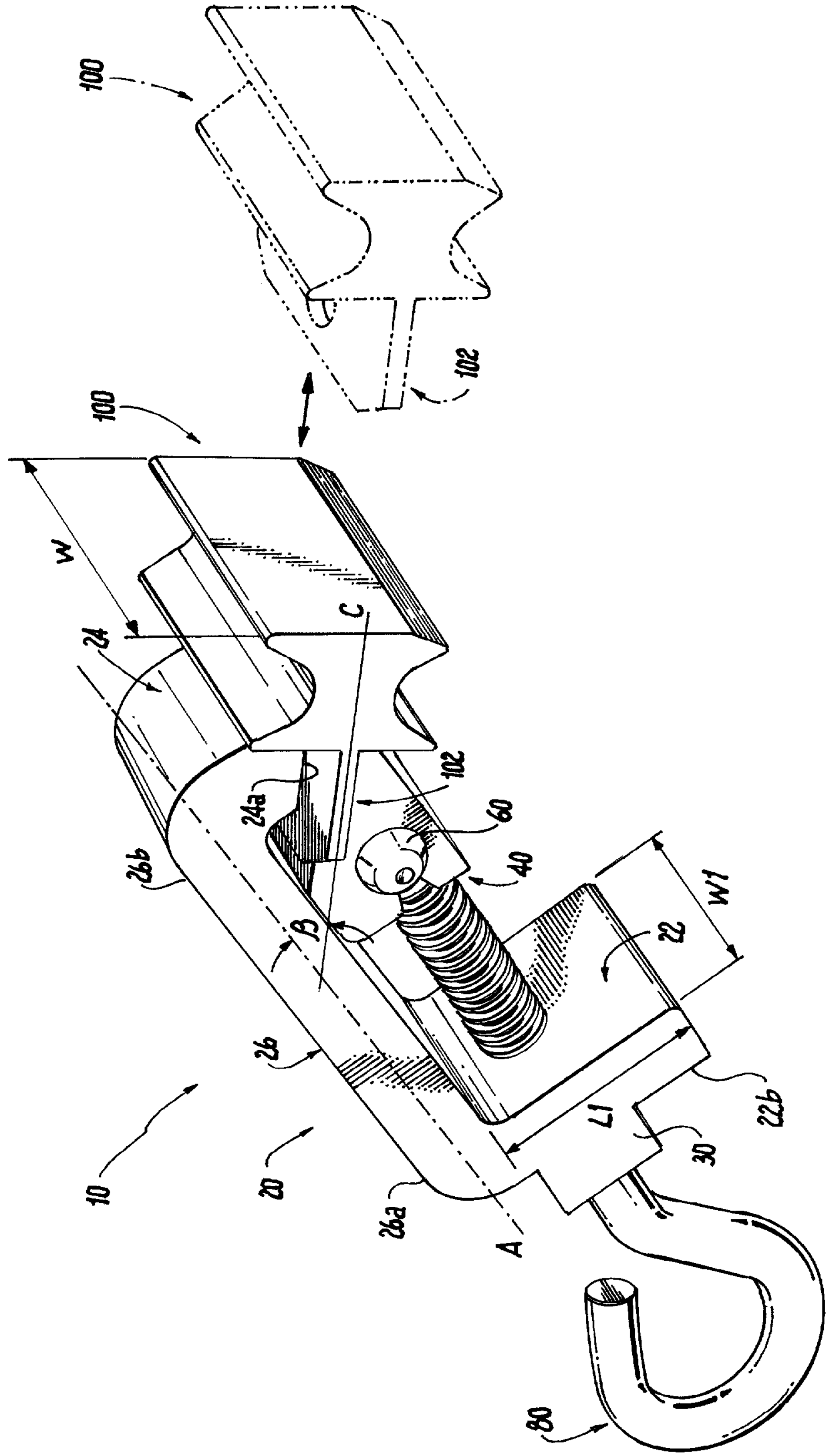
FIG. 1 is a perspective view of an exemplary embodiment of an interface gripping tool according to the present disclosure, illustrating the interface gripping tool gripping an adapter portion of a conductor interface of a wedge type cable connector assembly.
Figure 2:
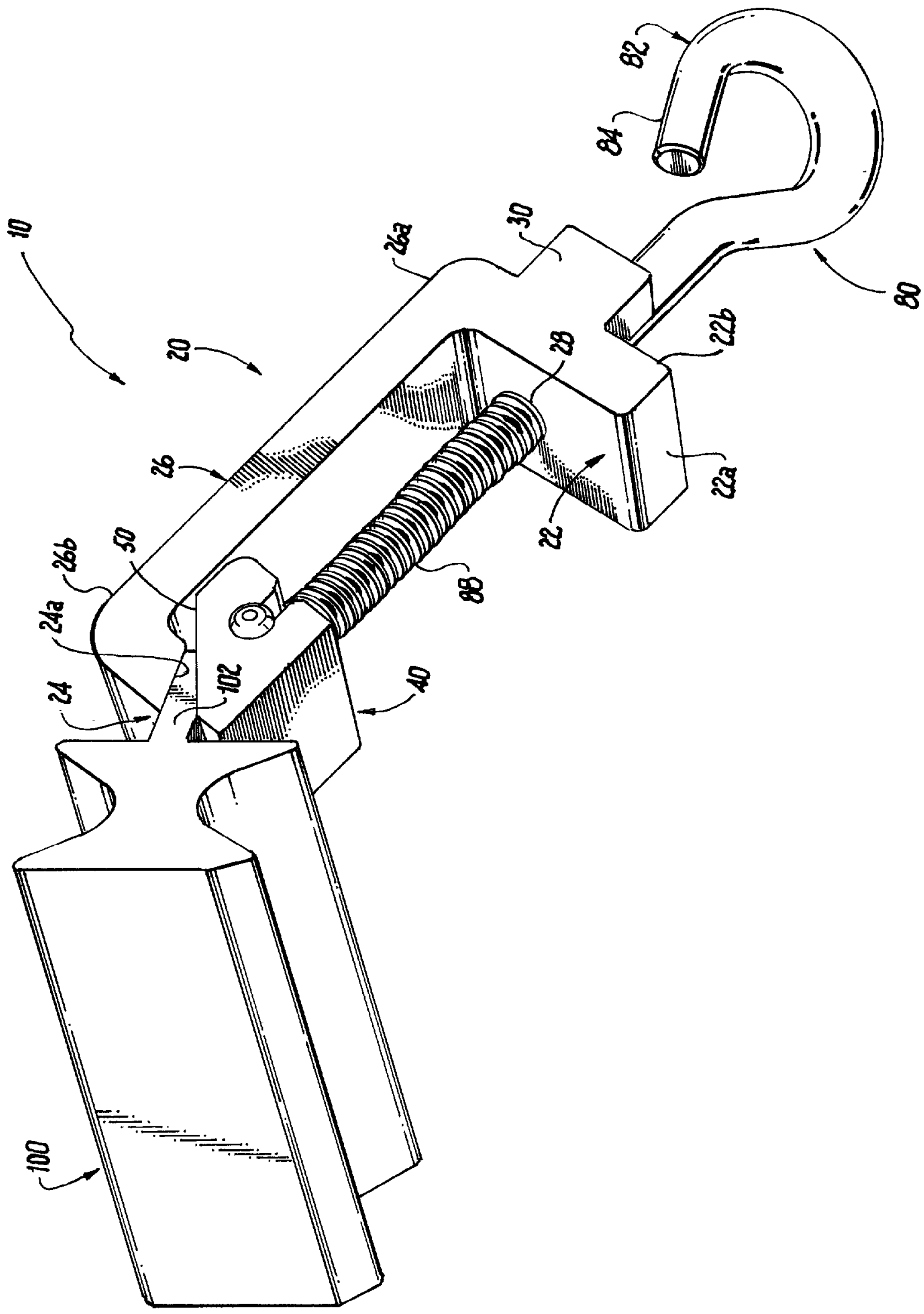
FIG. 2 is a perspective view of the interface gripping tool of FIG. 1, illustrating the interface gripping tool gripping a corner of the adapter portion of the conductor interface.

Continuing to refer to FIGS. 1-4, in the exemplary embodiment shown, the second arm 24 is a substantially flat member having a length "L2" and a width "W2," seen in FIG. 3. In the exemplary embodiment shown, the length "L2" of the second arm 24 is less than the length "L1" of the first arm 22. For example, the length "L2" may be in the range of about 0.25 inches and about 2 inches. However, the present disclosure contemplates embodiments where the length "L2" of the second arm 24 is greater than or equal to the length "L1" of the first arm 22. The width "W2" of the second arm 24 is preferably less than a width of the interface 100. For example, the width "W2" may be in the range of about 0.5 inches and about 3 inches. However, the present disclosure contemplates embodiments where the width "W2" of the second arm 24 is greater than or equal to the width "W" of the interface 100. The free end 24*a* of the second leg 24 provides a body gripping surface as shown in FIG. 3. The body gripping surface 24*a* may be a tapered surface relative to the back pad 26 of the body 20, a flat surface to the back pad 26 of the body 20 or another shaped surface. In the embodiment shown, the body gripping surface 24*a* is a tapered surface relative to the back pad 26 of the body 20. More specifically, the tapered body gripping surface 24*a* at the free end of the second arm 24 starts at the upper surface 24*b* of the second arm 24 and extends inwardly toward the back pad 26. The angle "a" of the taper is preferably set so that when the tool 10 grips an adapter portion 102 of an interface 100, a center axis "C" of the interface 100 is at an angle "β" relative to a longitudinal axis "A" of the back pad 26, as seen in FIG. 1. As a non-limiting example, the angle "β" may be in the range of about 15 degrees and about 75 degrees.

Referring to FIGS. 3 and 4, the gripping carriage 40 is a unitary or monolithic structure having an upper surface 42, a bottom surface 44, a front surface 46, a rear surface 48, a carriage gripping surface 50, a first side surface 52 and a second side surface 54. The gripping carriage 40 has a length "L3" and a width "W3." In the exemplary embodiment shown, the length "L3" of the gripping carriage 40 is less than the length "L1" of the first arm 22 and greater than the length "L2" of the second arm 24. For example, the length "L3" may be in the range of about 0.5 inches and about 2 inches. However, the present disclosure contemplates embodiments where the length "L3" of the gripping carriage 40 is greater than or equal to the length "L1" and/or less than or equal to the length "L2." The width "W3" of the second arm 24 is preferably less than the width of the interface 100. For example, the width "W3" may be in the range of about 0.5 inches and about 3 inches. However, the present disclosure contemplates embodiments where the width "W3" of the gripping carriage 40 is greater than or equal to the width "W" of the interface 100. It is also noted that the width "W1" of the first arm, the width "W2" of the second arm and the width "W3" of the gripping carriage 40 may be the same or they may differ. In the exemplary embodiment shown, the widths "W1," "W2" and "W3" are substantially the same.

Continuing to refer to FIGS. 3 and 4, the carriage gripping surface 50 of the gripping carriage 40 extends from the front surface 46 to the upper surface 42. The shape of the carriage gripping surface 50 of the gripping carriage 40 is preferably configured to match the shape of the body gripping surface 24*a* of the second arm 24. The carriage gripping surface may be an angled or tapered surface relative to the back pad 26 of the body 20, a flat surface relative to the back pad 26 of the body 20 or another shaped surface. In the embodiment shown, the carriage gripping surface 50 is a tapered surface relative to the back pad 26 of the body 20, where the angle "α" of the taper of the carriage gripping surface 50 may be in the range of about 15 degrees and about 75 degrees. The gripping carriage 40 includes a keyway 56 configured and dimensioned to receive a key 86 of the carriage adjuster 80. In the exemplary embodiment shown, the keyway 56 has a narrow portion 56*a* and a wide portion 56*b*. Having a keyway 56 with a narrow portion 56*a* and a wide portion 56*b* permits the key 86 of the carriage adjuster 80 positioned within the keyway 56 to freely rotate relative to the gripping carriage 40. The gripping carriage 40 also includes one or more plugs 60 that are configured and dimensioned to secure the key 86 of the carriage adjuster 80 within the gripping carriage 40, as shown in FIGS. 1-3. Extending through the bottom surface 44 of the gripping carriage 40 may be an opening 57 that intersects with the keyway 56 so that the key 86 of the carriage adjuster 80 can be inserted into the gripping carriage 40 through the opening 57.

Continuing to refer to FIGS. 3 and 4, the carriage adjuster 80 is configured and dimensioned to adjust the distance between the carriage gripping surface 50 of the gripping carriage 40 and the body gripping surface 24*a* of the second arm 24. The carriage adjuster 80 adjusts the distance between the carriage gripping surface 50 and the body gripping surface 24*a* at the free end of the second arm 24 between a loading position and a gripping position. When the carriage adjuster 80 is in the loading position, there is a sufficient gap between the carriage gripping surface 50 and the body gripping surface 24*a* so that an adapter portion 102 of an interface 100 can be positioned between the gripping surfaces 24*a* and 50. When the carriage adjuster 80 is in the gripping positioned, the gripping surfaces 24*a* and 50 grip and hold the adapter portion 102 of the interface 100, as seen in FIGS. 1 and 2. It is noted that the gripping surfaces 24*a* and 50 may include knurling or other surface texture to enhance the grip of the gripping surfaces 24*a* and 50 on the adapter portion 102 of the interface 100.

In the exemplary embodiment shown, the carriage adjuster 80 is an eye stem 82 having and eye 84, the key 86 and a threaded portion 88 between the eye 84 and the key 86. The eye 84 is used for coupling the tool 10 to an extendable reach tool 400, seen in FIG. 5. A non-limiting example of an extendable reach tool 400 is a hot stick. The key 86 is configured and dimensioned fit within the keyway 56 of the gripping carriage 40. In the exemplary embodiment shown, the key 86 has the narrow portion 86*a* and the wide portion 86*b*. As described above, the narrow portion 86*a* of the key 86 is configured and dimensioned to fit within the narrow portion 56*a* of the keyway 56, and the wide portion 86*b* of the key 86 is configured and dimensioned to fit within the wide portion 56*b* of the keyway 56. As noted above, the gripping carriage 40 includes one or more plugs 60 that are configured and dimensioned to secure the key 86 of the carriage adjuster 80 within the gripping carriage 40. The threaded portion 88 of the eye stem 82 is threaded into the bore 28 in the first arm 22, which in this exemplary embodiment is a threaded bore. Rotation of the eye 84 moves the gripping carriage 40 at least between the loading position and the gripping position.

Referring now to FIGS. 5 and 6, the installation of an interface 100 between a main conductor 300 and a tap conductor 310 positioned within a tap connector 110 using the tool 10 will be described. Initially, the gripping carriage 40 of the tool 10 is moved to the loading position using the carriage adjuster 80. The adaptor portion 102 of the interface 100 is then positioned between the body gripping surface 24*a* of the second arm 24 and the carriage gripping surface 50 of the gripping carriage 40, as shown. The carriage adjuster 80, which in this exemplary embodiment is an eye stem 82, is then rotated clockwise moving the gripping carriage 40 toward the gripping position. The eye stem 82 is rotated until the body gripping surface 24*a* of the second arm 24 and the carriage gripping surface 50 of the gripping carriage 40 grip and hold the adapter portion 102 of the interface 100. With the gripping surfaces 24*a* and 50 gripping and holding the adapter portion 102 of the interface 100, the gripping carriage 40 is in the gripping position. It is noted that in the exemplary embodiment of FIG. 1, the entire surface area of the gripping surfaces 24*a* and 50 grip the adapter portion 102 of the interface 100. In the exemplary embodiment of FIGS. 2 and 5, a portion of the surface area of the gripping surfaces 24*a* and 50 grip a portion, e.g., a corner portion, of the adapter portion 102 of the interface 100. With the adapter portion 102 of the interface 100 being gripped by the tool 10, the eye stem 82 is then coupled to an extendable reach tool 400, which in this exemplary embodiment is a hot stick. More specifically, a head portion 402 of the hot stick 400 has intersecting channels 404 and 406 that form four tabs 408. Each channel 404 and 406 includes an opening (not shown) that extends into a hollow portion of the hot stick 400. Each channel opening is configured and dimensioned to receive the eye 84 of the eye stem 82. A technician can then insert the carriage adjuster 80 into one of the channel openings in the head portion 402 of the hot stick 400 until the one or more stabilizing legs 30 extending from the bottom surface 22*b* of the first arm 22 are positioned within respective channels 404 or 406, as shown in FIG. 5. The channel openings in the hot stick 400 may be configured so that when the carriage adjuster 80 is inserted into a channel opening, the carriage adjuster 80 is temporarily held in place by a friction fit, or a hook 410 within the hot stick 400 can capture the eye 84 of the eye stem 82, as seen in FIG. 5.

A technician can then attach a frame 112 of a tap connector 110 to the main conductor 300 using a second hot stick 450, as shown in FIG. 5, and position a tap conductor 310 on a wedge 114 of a wedge assembly 116 of the tap connector 110. The technician can then maneuver the hot stick 400 so that the interface 100 is positioned within a gap "G" between the main conductor 300 and the tap conductor 310 typically at a point away from a center of the frame 112 of the tap connector 110. The interface 100 is then moved between and along the conductors 300 and 310 until the interface 100 is generally centered on the frame 112 of the tap connector 110, as shown in FIG. 6. The conductors 300 and 310 are then electrically and mechanically secured to the tap connector 110 by tightening a fastener 118 of the wedge assembly 114 using a third hot stick 500, as is known. With the conductor 300 and 310 secured to the tap connector 110, the technician can then remove the tool 10 from the adapter portion 102 of the interface 100 by rotating the hot stick 400 counter-clockwise so that the gripping carriage 40 moves to the loading position. With the gripping carriage 40 in the loading position, the adapter portion 102 of the interface 100 can be removed from the tool 10.

The body 20, gripping carriage 40 and the carriage adjuster 80 of the tool 10 are made of a rigid material sufficient to grip and hold the adapter portion 102 of the interface 100, and to be coupled to an extendable reach tool 400 so that the tool 10 can be hoisted into close proximity to a tap connector 110 resting on an above-ground main conductor 300. As such, the body 20, gripping carriage 40 and the carriage adjuster 80 may be made of a rigid metallic material, such as aluminum, cast aluminum and stainless steel, or the body 20, gripping carriage 40 and the carriage adjuster 80 may be made of a rigid non-metallic material, such as rigid thermoplastic material, e.g., Polyvinyl chloride (PVC) or Polyvinylidene Fluoride (PVDF), or thermoset rigid composite materials.

Figure 7:
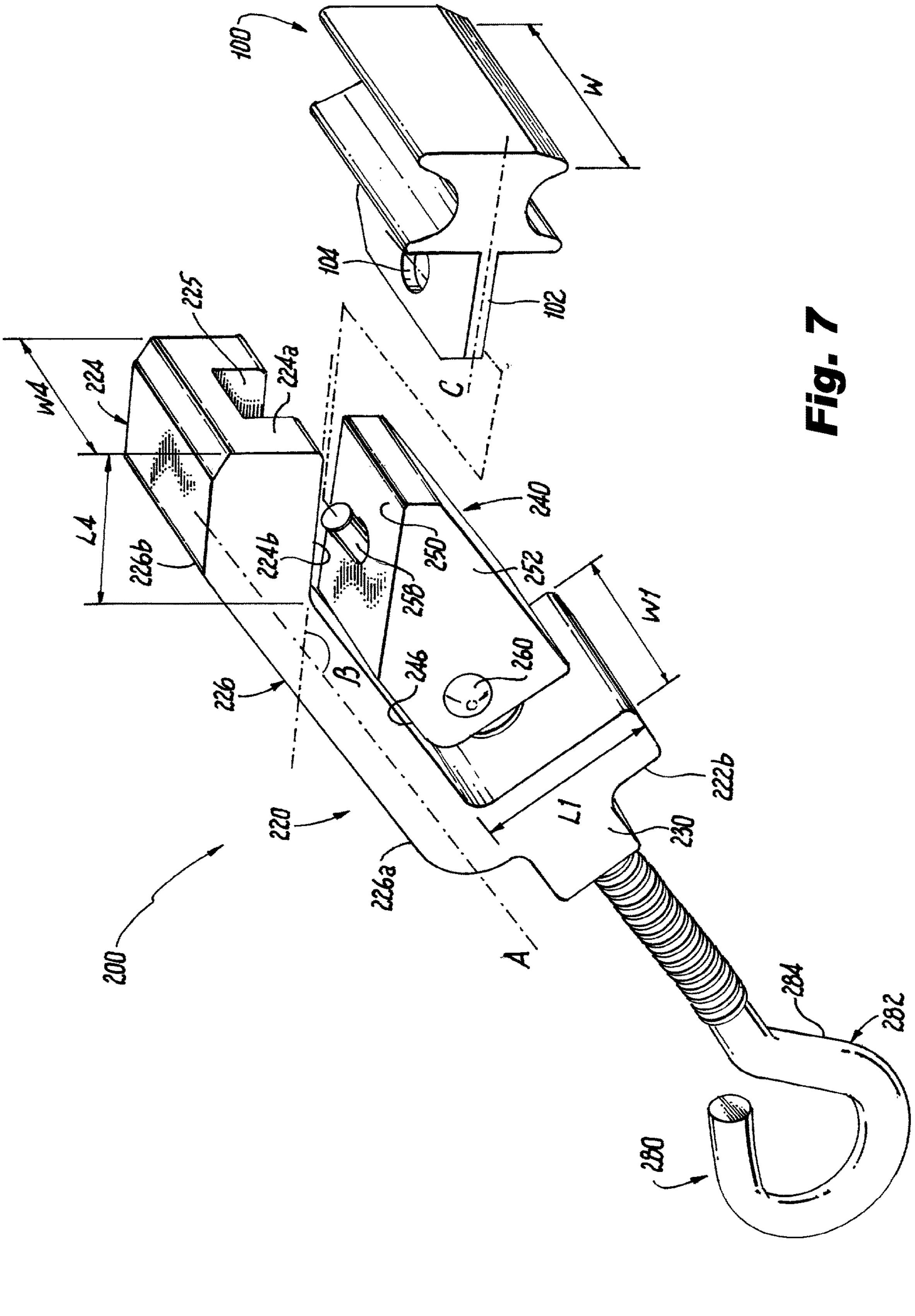
FIG. 7 is a perspective view of another exemplary embodiment of an interface gripping tool according to the present disclosure, illustrating the interface gripping tool positioned to grip an adapter portion of a conductor interface of a wedge type cable connector assembly.
Figure 8:
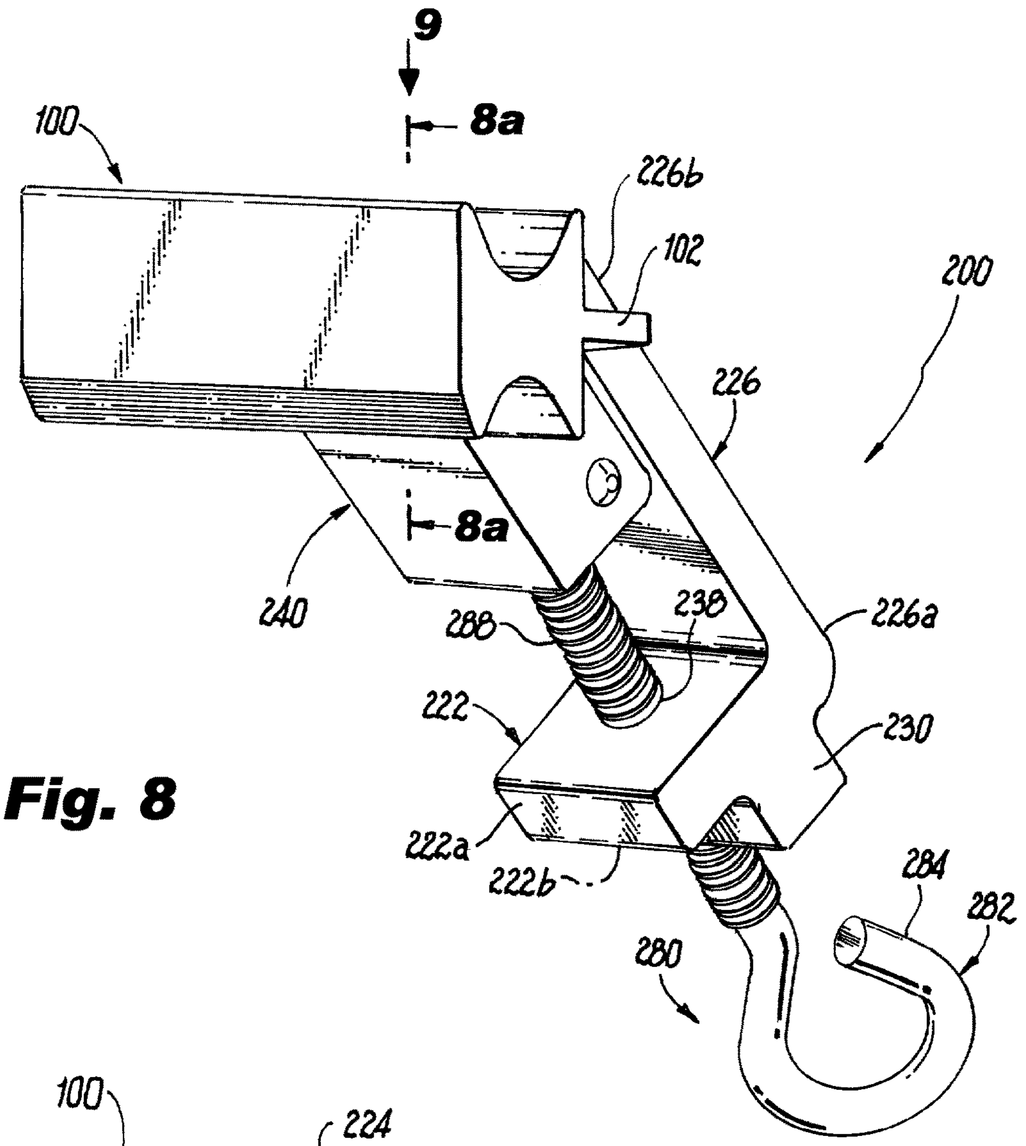
FIG. 8 is a perspective view of the interface gripping tool of FIG. 7, illustrating the interface gripping tool gripping the adapter portion of the conductor interface.
Figure 12:
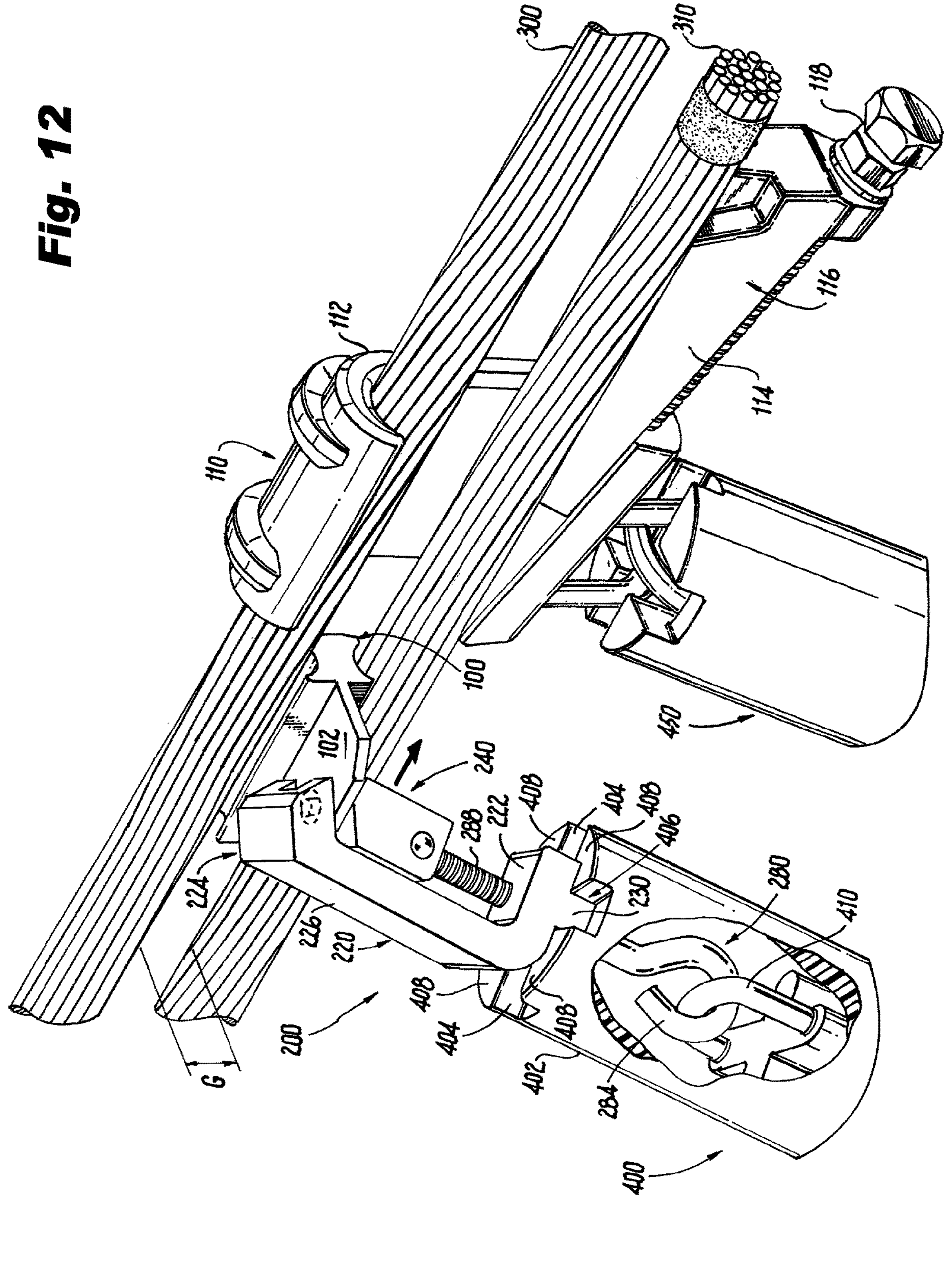
FIG. 12 is a perspective view of the interface gripping tool of FIG. 7 gripping the adapter portion of the conductor interface at an angle and coupled to an extendable reach tool with the conductor interface positioned for insertion between a main conductor and a tap conductor within a wedge type cable connector assembly.
Figure 13:
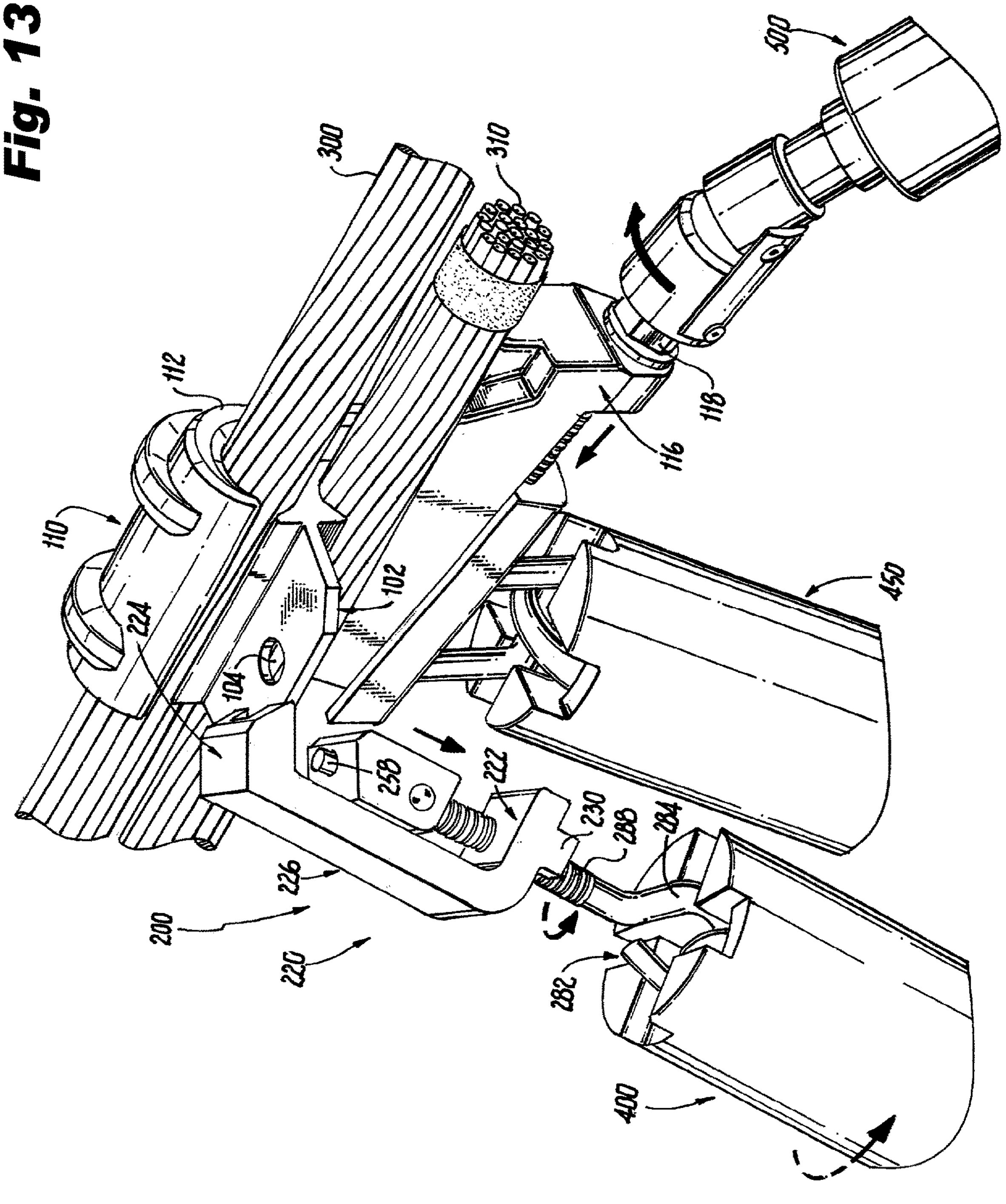
FIG. 13 is a perspective view of the interface gripping tool, extendable reach tool and wedge type cable connector assembly of FIG. 12, with the main conductor, the tap conductor and the conductor interface within the wedge type cable connector assembly, and illustrating the interface gripping tool being removed from the conductor interface.

Referring to FIGS. 7 and 8, another exemplary embodiment of a tool 200 according to the present disclosure is shown gripping an adapter portion 102 of an interface 100 of a tap connector 110, seen in FIG. 12. The tool 200 includes a body 220, a gripping carriage 240 and carriage adjuster 280. The body 220 may be of unitary or monolithic construction and is formed into a U-shaped like or C-shaped like structure having two arms 222 and 224 joined by a back pad 226. The first arm 222 extends from one end 226*a* of the back pad 226 and ends at a free end 222*a*, and the second arm 224 extends from another end 226*b* of the back pad 226 and ends at a free end 224*a*. In the exemplary embodiment shown, the first arm 222 is a substantially flat member having a length "L1" and a width "W1." The length "L1" of the first arm 222 helps with the attachment of the tool 200 to an extendable reach tool, e.g., a hot stick. The length "L1" may be in the range of about 0.5 inches and about 2 inches. The width "W1" is preferably less than a width "W" of the interface 100. For example, the width "W1" of the first arm 222 may be in the range of about 0.5 inches and about 3 inches. However, the present disclosure contemplates embodiments where the width "W1" of the first arm 222 is greater than or equal to a width "W" of the interface 100. The arm 222 includes a bore 228 therethrough used to couple the carriage adjuster 280 to the body 220. The bore 228 may be a threaded bore or a smooth bore. In the exemplary embodiment shown, the bore 228 is a threaded bore. Extending from a bottom surface 222*b* of the first arm 222 is one or more stabilizing legs 230. The stabilizing legs 230 are provided to interact with a head portion of an extendable reach tool 400, e.g., a hot stick, as shown in FIGS. 12 and 13 and described in more detail below.

Continuing to refer to FIGS. 7-13, in the exemplary embodiment shown, the second arm 224 is a substantially flat member having a length "L4" and a width "W4," seen in FIG. 7. In the exemplary embodiment shown, the length "L4" of the second arm 224 is less than the length "L1" of the first arm 222. For example, the length "L4" may be in the range of about 0.25 inches and about 2 inches. However, the present disclosure contemplates embodiments where the length "L4" of the second arm 224 is greater than or equal to the length "L1" of the first arm 222. The width "W4" of the second arm 224 is preferably less than a width of the interface 100. For example, the width "W4" may be in the range of about 0.5 inches and about 3 inches. However, the present disclosure contemplates embodiments where the width "W4" of the second arm 224 is greater than or equal to the width "W" of the interface 100. The second arm 224 includes a pin receiving notch 225 configured to receive an interface aligning member 258 of the gripping carriage 240, seen in FIG. 8*a* and described in more detail below.

Figure 10:
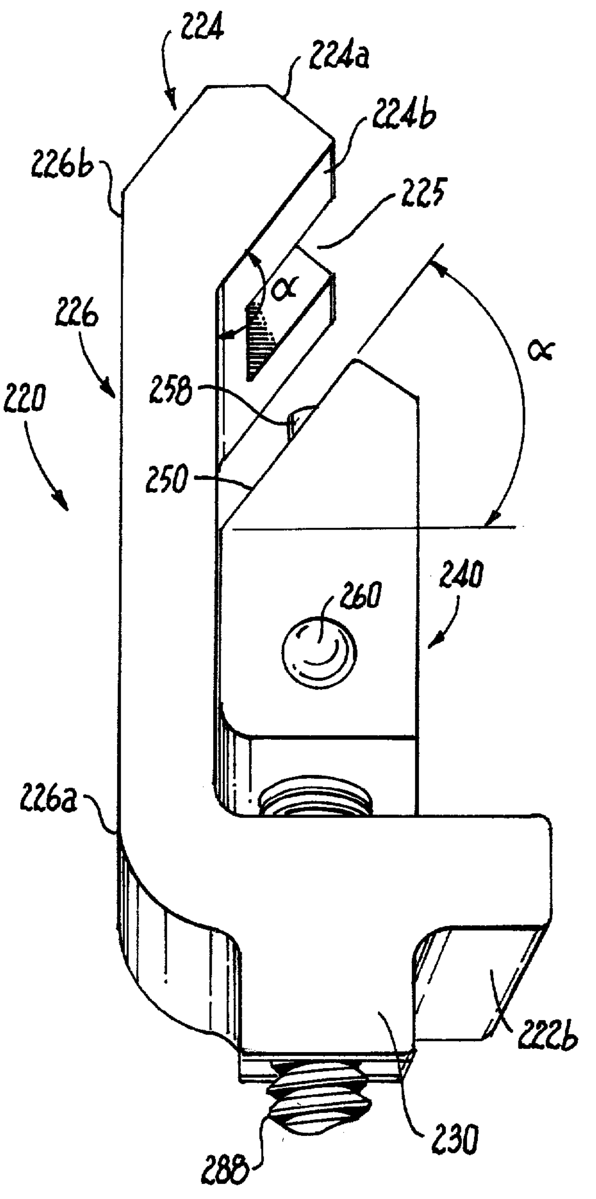
FIG. 10 is a bottom perspective view of a portion of the interface gripping tool of FIG. 7, illustrating a body of the interface gripping tool with an arm having a tapered gripping surface, and gripping carriage of the interface gripping tool with a tapered gripping surface and the interface aligning member extending from the gripping carriage toward the tapered gripping surface of the arm.
Figure 10A:
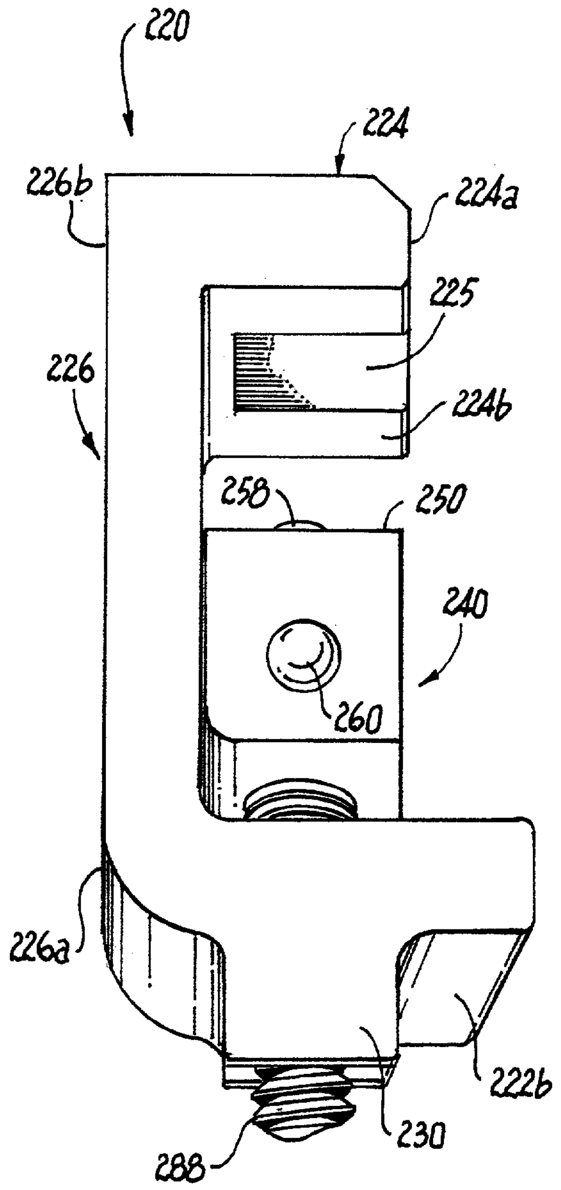
FIG. 10*a* is a bottom perspective view of a portion of another exemplary embodiment of the interface gripping tool according to the present disclosure, illustrating a body of the interface gripping tool with an arm having a flat gripping surface, and gripping carriage of the interface gripping tool with a flat gripping surface and the interface aligning member extending from the carriage toward the flat gripping surface of the arm.

Referring to FIGS. 7, 10 and 10*a*, a bottom surface 224*b* of the second arm 224 provides a body gripping surface, shown in FIG. 10. The body gripping surface 224*b* may be an angled or tapered surface relative to the back pad 226 of the body 220, seen in FIG. 10, a flat surface to the back pad 226 of the body 220, seen in FIG. 10*a*, or another shaped surface. This embodiment will be described herein with the body gripping surface 224*b* as a tapered surface relative to the back pad 226 of the body 220. The body gripping surface 224*b* of the second arm 224 starts at the free end 224*a* of the second arm 224 and extends inwardly toward an inside surface of the back pad 226. The angle "α" of the taper is preferably set so that when the tool 200 grips an adapter portion 102 of an interface 100, a center axis "C" of the interface 100 is at an angle "β" relative to a longitudinal axis "A" of the back pad 226, as seen in FIG. 7. As a non-limiting example, the angle "β" may be in the range of about 15 degrees and about 75 degrees.

Figure 11:
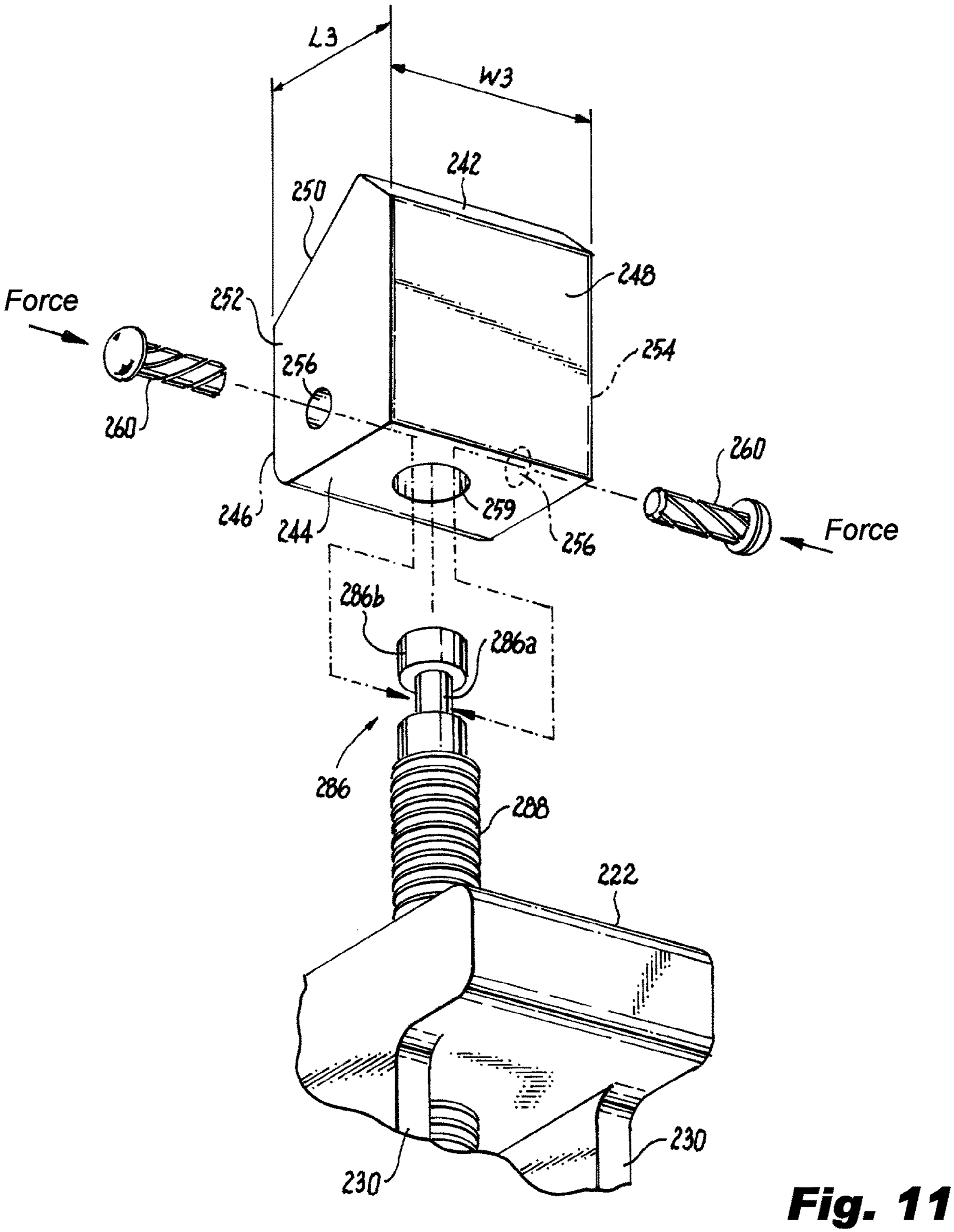
FIG. 11 is exploded bottom perspective view of a portion of the interface gripping tool of FIG. 7, illustrating the gripping carriage separated from a carriage adjuster of the interface gripping tool.

Referring to FIGS. 7 and 11, the gripping carriage 240 is a unitary or monolithic structure having an upper surface 242, a bottom surface 244, a front surface 246, a rear surface 248, a carriage gripping surface 250, e.g., a tapered surface, a first side surface 252 and a second side surface 254. The gripping carriage 40 has a length "L3" and a width "W3." In the exemplary embodiment shown, the length "L3" of the gripping carriage 240 is less than the length "L1" of the first arm 222 and greater than the length "L4" of the second arm 224. For example, the length "L3" may be in the range of about 0.5 inches and about 2 inches. However, the present disclosure contemplates embodiments where the length "L3" of the gripping carriage 240 is greater than or equal to the length "L1" and/or less than or equal to the length "L4." The width "W3" of the second arm 224 is preferably less than the width of the interface 100. For example, the width "W3" may be in the range of about 0.5 inches and about 3 inches. However, the present disclosure contemplates embodiments where the width "W3" of the gripping carriage 240 is greater than or equal to the width "W" of the interface 100. It is also noted that the width "W1" of the first arm 222, the width "W4" of the second arm 224 and the width "W3" of the gripping carriage 240 may be the same or they may differ. In the exemplary embodiment shown, the widths "W1," "W2" and "W3" are substantially the same.

Figure 8A:
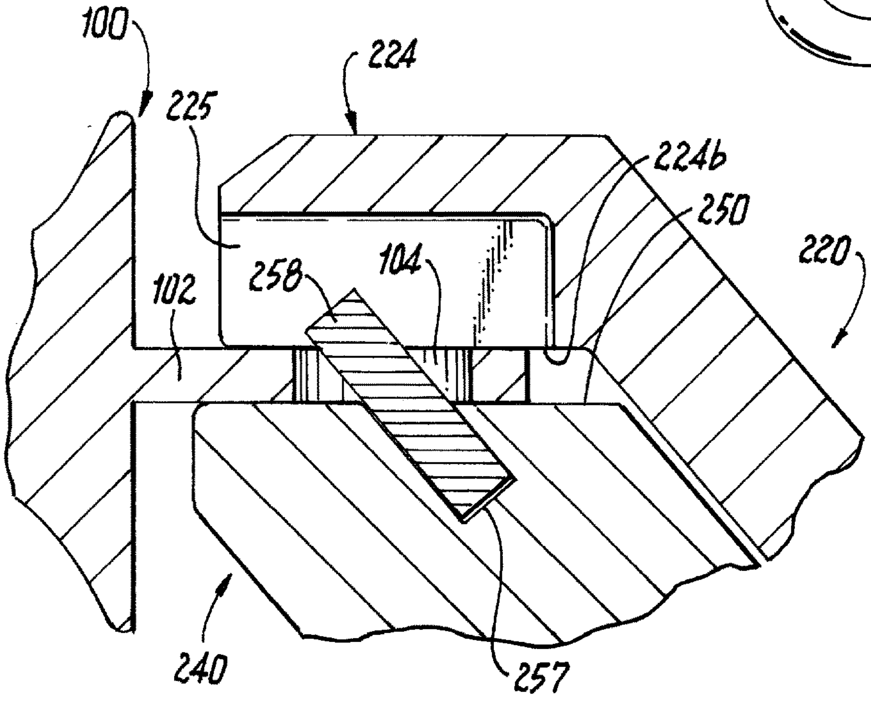
FIG. 8*a* is a cross-sectional view of a portion of the interface gripping tool of FIG. 8 taken along line 8-8, illustrating an interface aligning member extending from a gripping carriage of the interface gripping tool positioned within an aligning aperture of the adapter portion of the conductor interface.
Figure 9:
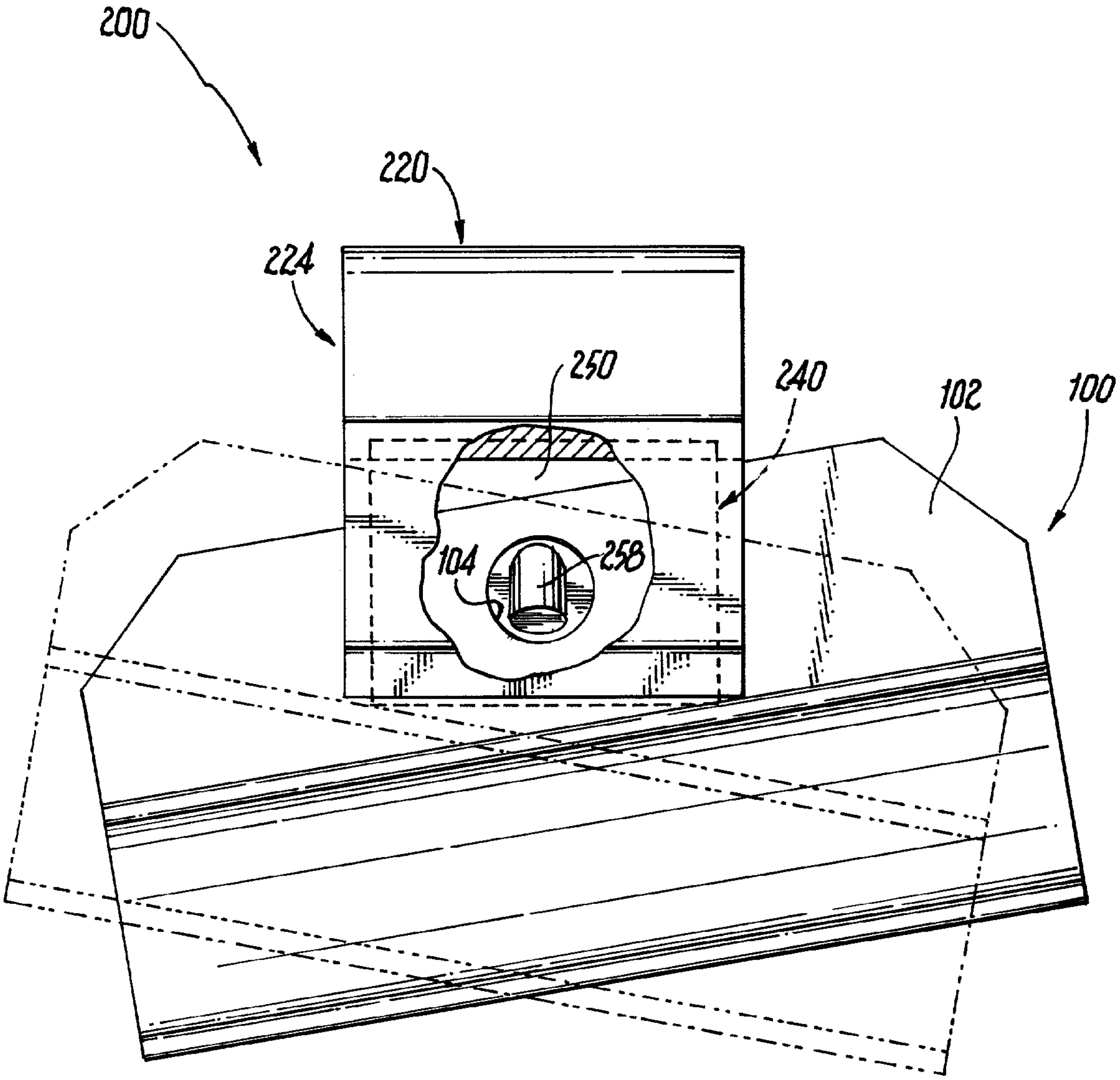
FIG. 9 is a top plan view of the interface gripping tool of FIG. 8, illustrating rotational positioning of the conductor interface being gripped by the interface gripping tool.

Referring to FIGS. 7, 10, 10*a* and 11, the carriage gripping surface 250 of the gripping carriage 240 extends from the front surface 246 to the upper surface 242. The shape of the carriage gripping surface 250 of the gripping carriage 240 is preferably configured to match the shape of the body gripping surface 224*b* of the second arm 224. The carriage gripping surface 250 may be an angled or tapered surface relative to the back pad 226 of the body 220, seen in FIG. 10, a flat surface to the back pad 226 of the body 220, seen in FIG. 10*a*, or another shaped surface. In this embodiment, the carriage gripping surface 250 is described with a tapered surface relative to the back pad 226 of the body 220, where the angle "α" of the taper of the carriage gripping surface 250 may be in the range of about 15 degrees and about 75 degrees. The gripping carriage 240 includes one or more plug holes 256 configured and dimensioned to receive one or more plugs 260. The one or more plugs 260 are configured and dimensioned to secure a key 286 of the carriage adjuster 280 within the gripping carriage 240, as shown in FIG. 11. Extending from the carriage gripping surface 250 of the gripping carriage 240 is an interface aligning member 258. The interface aligning member 258 is configured and dimensioned to fit within an aperture 104 in the adapter portion 102 of the interface 100, as seen in FIG. 8*a*. In the embodiment shown, the interface aligning member 258 may be a solid or hollow pin like structure that is press fit into an opening 257 in the carriage gripping surface 250 of the gripping carriage 240. As shown in FIG. 8, when the gripping carriage 240 is in the gripping position, described in more detail below, the interface aligning member 258 is received within the pin receiving notch 225 of the second arm 224. With the interface aligning member 258 within the pin receiving notch 225 a positive interconnection between the gripping carriage 240 and the interface 100 is provided. This positive interface prevents the interface 100 from being removed from the tool 200. In addition, this positive interface permits the interface 100 to be rotated to adjust the positioning of the interface relative to the body 220 of the tool 200, as seen in FIG. 9.

Continuing to refer to FIGS. 7, 8 and 11, the carriage adjuster 280 is configured and dimensioned to adjust the distance between the carriage gripping surface 250 of the gripping carriage 240 and the body gripping surface 224*b* of the second arm 224. The carriage adjuster 280 adjusts the distance between the carriage gripping surface 250 and the body gripping surface 224*b* between a loading position and a gripping position. When the carriage adjuster 280 is in the loading position, there is a sufficient gap between the carriage gripping surface 250 and the body gripping surface 224*b* so that an adapter portion 102 of an interface 100 can be positioned between the gripping surfaces 224*b* and 250. When the carriage adjuster 280 is in the gripping positioned, the gripping surfaces 224*b* and 250 grip and hold the adapter portion 102 of the interface 100, as seen in FIG. 8*a*. It is noted that the gripping surfaces 224*b* and 250 may include knurling or other surface texture to enhance the grip of the gripping surfaces 224*b* and 250 on the adapter portion 102 of the interface 100.

In the exemplary embodiment shown, the carriage adjuster 280 is an eye stem 282 having and eye 284, the key 286 and a threaded portion 288 between the eye 284 and the key 286. The eye 284 is used for coupling the tool 200 to an extendable reach tool 400, seen in FIG. 12. A non-limiting example of an extendable reach tool 400 is a hot stick. The key 286 is configured and dimensioned fit within an opening 259 in the bottom surface 244 of the gripping carriage 240. In the exemplary embodiment shown, the opening 259 intersects with the one or more plug holes 256. As noted above, the gripping carriage 240 includes one or more plugs 260 that are configured and dimensioned to secure the key 286 of the carriage adjuster 280 within the gripping carriage 240. The threaded portion 288 of the eye stem 282 is threaded into the bore 228 in the first arm 222, which in this exemplary embodiment is a threaded bore. Rotation of the eye 284 moves the gripping carriage 240 at least between the loading position and the gripping position.

Referring now to FIGS. 12 and 13, the installation of an interface 100 between a main conductor 300 and a tap conductor 310 positioned within a tap connector 110 using the tool 200 will be described. Initially, the gripping carriage 240 of the tool 200 is moved to the loading position, seen in FIG. 7, using the carriage adjuster 280. The adaptor portion 102 of the interface 100 is then positioned between the body gripping surface 224*b* of the second arm 224 and the carriage gripping surface 250 of the gripping carriage 240 so that the interface aligning member 258 is positioned in the aperture 104 of the adapter portion 102 of the interface 100, as seen in FIGS. 7 and 8*a*. The carriage adjuster 280, which in this exemplary embodiment is an eye stem 282, is then rotated clockwise moving the gripping carriage 240 toward the gripping position. The eye stem 282 is rotated until the body gripping surface 224*b* of the second arm 224 and the carriage gripping surface 250 of the gripping carriage 240 grip and hold the adapter portion 102 of the interface 100, as seen in FIG. 12. With the gripping surfaces 224*b* and 250 and the interface aligning member 258 gripping and holding the adapter portion 102 of the interface 100, the gripping carriage 240 is in the gripping position. As shown in the exemplary embodiment of FIG. 9, the interface 100 can be moved, e.g., pivoted or rotated, between the gripping surfaces 224*b* and 250 about the interface aligning member 258 acting as a pivot point to align the interface 100 for installation between the main conductor 300 and the tap conductor 310. With the adapter portion 102 of the interface 100 being gripped by the tool 200, the eye stem 282 is then coupled to an extendable reach tool 400, seen in FIG. 12, which in this exemplary embodiment is a hot stick. More specifically, a head portion 402 of the hot stick 400 has intersecting channels 404 and 406 that form four tabs 408. Each channel 404 and 406 includes an opening (not shown) that extends into a hollow portion of the hot stick 400. Each channel opening is configured and dimensioned to receive the eye 284 of the eye stem 282. A technician can then insert the carriage adjuster 280 into one of the channel openings in the head portion 402 of the hot stick 400 until the one or more stabilizing legs 230 extending from the bottom surface 222*b* of the first arm 222 are positioned within respective channels 404 or 406, as shown in FIG. 12. The channel openings in the hot stick 400 may be configured so that when the carriage adjuster 280 is inserted into a channel opening, the carriage adjuster 280 is temporarily held in place by a friction fit, or a hook 410 within the hot stick 400 can capture the eye 284 of the eye stem 282, as seen in FIG. 12.

A technician can then attach a frame 112 of a tap connector 110 to the main conductor 300 using a second hot stick 450, as shown in FIG. 12, and position a tap conductor 310 on a wedge 114 of a wedge assembly 116 of the tap connector 110. The technician can then maneuver the hot stick 400 so that the interface 100 is positioned within a gap "G" between the main conductor 300 and the tap conductor 310 typically at a point away from a center of the frame 112 of the tap connector 110. The interface 100 is then moved between and along the conductors 300 and 310 until the interface 100 is generally centered on the frame 112 of the tap connector 110, as shown in FIG. 13. The conductors 300 and 310 are then electrically and mechanically secured to the tap connector 110 by tightening a fastener 118 of the wedge assembly 114 using a third hot stick 500, as is known. With the conductor 300 and 310 secured to the tap connector 110, the technician can then remove the tool 200 from the adapter portion 102 of the interface 100 by rotating the hot stick 400 counter-clockwise so that the gripping carriage 240 moves to the loading position. With the gripping carriage 240 in the loading position, the adapter portion 102 of the interface 100 can be removed from the tool 200 as shown in FIG. 13.

The body 220, gripping carriage 240 and the carriage adjuster 280 of the tool 200 are made of a rigid material sufficient to grip and hold the adapter portion 102 of the interface 100, and to be coupled to an extendable reach tool 400 so that the tool 200 can be hoisted into close proximity to a tap connector 110 resting on an above-ground main conductor 300. As such, the body 220, gripping carriage 240 and the carriage adjuster 280 may be made of a rigid metallic material, such as aluminum, cast aluminum, and stainless steel, or the body 220, gripping carriage 240 and the carriage adjuster 280 may be made of a rigid non-metallic material, such as rigid thermoplastic material, e.g., Polyvinyl chloride (PVC) or Polyvinylidene Fluoride (PVDF), or thermoset rigid composite materials.

Figure 14:
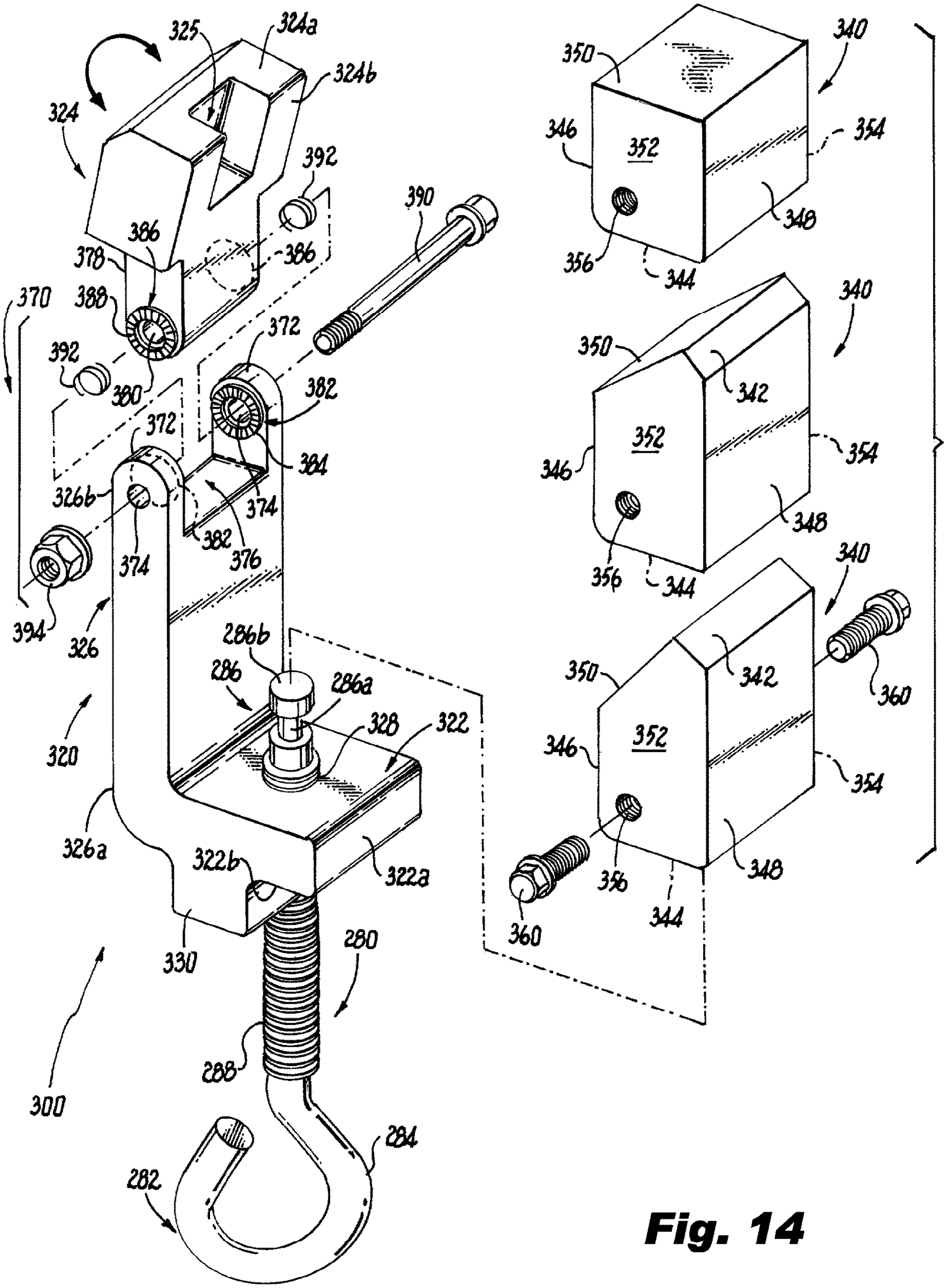
FIG. 14 is a perspective view of another exemplary embodiment of the interface gripping tool according to the present disclosure, illustrating removable gripping carriages each with a different shape gripping surface and an arm of the body being movable to adjust an orientation of a gripping surface of the arm.

Turning now to FIG. 14, another exemplary embodiment of a tool 300 according to the present disclosure is shown. The tool 300 includes a body 320, a gripping carriage 340 and carriage adjuster 280. In this exemplary embodiment, the carriage adjuster 280 is the same as the carriage adjuster described above so that a description thereof is not repeated. The body 320 has two arms 322 and 324 joined by a back pad 326. The first arm 322 extends from one end 326*a* of the back pad 326 and ends at a free end 322*a*, and the second arm 324 is operatively coupled to and extends from another end 326*b* of the back pad 226 and ends at a free end 324*a*. In the exemplary embodiment shown, the first arm 322 is a substantially flat member that is substantially the same as the first arm 222 described above. The first arm 322 includes a bore 328 therethrough used to couple the carriage adjuster 280 to the body 320. The bore 328 may be a threaded bore or a smooth bore. In the exemplary embodiment shown, the bore 328 is a threaded bore. Extending from a bottom surface 322*b* of the first arm 322 is one or more stabilizing legs 330. The stabilizing legs 330 are provided to interact with a head portion of an extendable reach tool 400, e.g., a hot stick, similar to the stabilizing legs 30 and 230 described above.

Continuing to refer to FIG. 14, the second arm 324 is dimensionally similar to the second arms 24 and 224 described above, and may include a pin receiving notch 325 configured to receive an interface aligning member extending from a gripping carriage, similar interface aligning member 258 extending from the gripping carriage 240 described above. A bottom surface 324*b* of the second arm 324 provides a body gripping surface. In this exemplary embodiment, the second arm 324 articulates relative to the body 320 so that the body gripping surface 324*b* may be an angled surface relative to the back pad 226 of the body 220, or a flat surface to the back pad 226 of the body 220. To articulate the second arm 324, the second arm is operatively coupled to and extends from the end 326*b* of the back pad 226 using, for example, a tilt lock assembly 370. In one non-limiting example, the end 326*b* of the back pad 326 includes a pair of spaced apart legs 372 each having a bore 374 therethrough. The spaced apart legs 372 form a channel 376 configured and dimensioned to receive a tongue 378 forming part of the second arm 324. The spaced apart legs 372 and channel 376 form a portion of the tilt lock assembly 370. An interior surface of each leg 372 includes a rosette member 382 aligned with a respective bore 374, as shown. Each rosette member 382 may include a washer like plate secured to or formed into the leg 372, and a plurality of teeth 384 are formed radially and annularly around a center opening of the plate. The center opening of each plate is positioned on the leg 372 to align with the respective bore 374 on the leg 372. The tilt lock assembly 370 also includes the tongue 378 of the second arm 324. The tongue 378 includes a bore 380 therethrough configured to align with the bores 374 in the legs 372 when the tongue 378 is positioned between the pair of legs 372. Exterior sides of the tongue 378 include a rosette member 386 aligned with the bore 380, as shown. Each rosette member 386 may include a washer like plate with a plurality of teeth 388 formed radially and annularly around a center opening. The center opening of the plate is positioned on the tongue 378 to align with the bore 380 through the tongue. When the tongue 378 is positioned within the channel 376, the teeth 384 and 388 mesh, and a bolt 390 is passed through the bores 374 and 380 and springs 392 and secured with a nut 394 so that the meshed teeth are locked in the current meshed position. By loosening the nut 394, the second arm 224 can be pivoted or rotated to adjust the position of the body gripping surface 324*a* of the second arm 224 relative to the body 320, as shown.

The gripping carriage 340 is a unitary or monolithic structure having different surfaces that may include an upper surface 342, a bottom surface 344, a front surface 346, a rear surface 348, a carriage gripping surface 350, a first side surface 352 and a second side surface 354. The dimensions of the gripping carriage 340 are similar to the gripping carriages 40 and 240 described above. In this exemplary embodiment, the bottom surface 344 of the gripping carriage 340 includes an opening, similar to opening 259 described above, that receives the key 286 of the carriage adjuster 280. In the exemplary embodiment shown, the opening in the bottom surface 344 intersects with the one or more plug holes 356 in the side walls 352 and 354 of the gripping carriage 340. In this embodiment, the one or more plug holes 356 are threaded holes configured to receive threaded machine screws 360 that are configured and dimensioned to secure the key 286 of the carriage adjuster 280 within the gripping carriage 340. Using the machine screws 360, permits the gripping carriage 340 to be removable so that different carriage gripping surfaces 350 can be used with the tool 300. When a different gripping carriage 340 is coupled to the carriage adjuster 280, the second arm 324 can be articulated or tilted so that the body gripping surface 324*b* of the second arm 324 is substantially parallel to the carriage gripping surface 350 of the newly coupled gripping carriage 340.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A connector interface gripping tool comprising:

a substantially C-shaped body having a substantially flat and tapered body gripping surface;

a carriage adjuster having at least a portion extending through the body and movable relative to the body, the carriage adjuster having a key at a first end; and a gripping carriage coupled to the key of the carriage adjuster such that the gripping carriage is movable relative to the carriage adjuster and such that the carriage adjuster can move the gripping carriage between a loading position and a gripping position relative to the body, the gripping carriage having a substantially flat and tapered carriage gripping surface, wherein the taper of the carriage gripping surface is configured to align with the taper of the body gripping surface when the gripping carriage is in the gripping position.

2. The connector interface tool according to claim 1, wherein the substantially C-shaped body comprises a back pad, a first arm having a bore therethrough extending from the back pad, and a second arm extending from the back pad in the same direction as the first arm, the second arm being spaced apart from the first arm and having the body gripping surface.

3. The connector interface tool according to claim 2, wherein the carriage adjuster extends through the bore in the first arm and is movable relative to the bore.

4. The connector interface tool according to claim 2, wherein the first arm includes at least one stabilizing leg extending from an exterior surface of the first arm.

5. The connector interface tool according to claim 1, wherein when the gripping carriage is in the loading position there is a gap between the carriage gripping surface and the body gripping surface sufficient to permit an adapter portion of the connector interface to be positioned between the carriage gripping surface and the body gripping surface, and when the gripping carriage is in the gripping position the carriage gripping surface and the body gripping surface grip and hold the adapter portion of the connector interface.

6. The connector interface tool according to claim 1, wherein the carriage adjuster comprises an eye stem having an eye, the key and a threaded portion between the eye and the key.

7. The connector interface tool according to claim 1, wherein the gripping carriage comprises a keyway configured and dimensioned to receive the key of the carriage adjuster.

8. The connector interface tool according to claim 7, wherein the gripping carriage keyway comprises a narrow keyway portion and a wide keyway portion, and wherein the key of the carriage adjuster comprises a narrow key portion configured to receive the narrow keyway portion and a wide key portion configured to receive the wide keyway portion.

9. The connector interface tool according to claim 1, wherein the carriage gripping surface includes an interface aligning member extending away therefrom.

10. A connector interface gripping tool comprising:

a body having a first arm, a second arm and a back pad between the first arm and the second arm, the first arm having a bore therethrough and at least one stabilizing leg extending from a surface of the first arm, the second arm being spaced apart from the first arm and having a free end with a substantially flat and tapered body gripping surface;

a carriage adjuster having at least a portion extending through the bore in the first arm and movable relative to the bore, the carriage adjuster having a key at a first end; and a gripping carriage coupled to the key of the carriage adjuster such that the gripping carriage is movable relative to the carriage adjuster and such that the carriage adjuster can move the gripping carriage between a loading position and a gripping position relative to the body, the gripping carriage having a substantially flat and tapered carriage gripping surface, wherein the taper of the carriage gripping surface is configured to align with the taper of the body gripping surface when the gripping carriage is in the gripping position.

11. The connector interface tool according to claim 10, wherein the body is a substantially C-shaped body.

12. The connector interface tool according to claim 10, wherein when the gripping carriage is in the loading position there is a gap between the carriage gripping surface and the body gripping surface sufficient to permit an adapter portion of the connector interface to be positioned between the carriage gripping surface and the body gripping surface, and when the gripping carriage is in the gripping position the carriage gripping surface and the body gripping surface grip and hold the adapter portion of the connector interface.

13. The connector interface tool according to claim 10, wherein the carriage adjuster comprises an eye stem having an eye, the key and a threaded portion between the eye and the key.

14. The connector interface tool according to claim 10, wherein the gripping carriage comprises a keyway configured and dimensioned to receive the key of the carriage adjuster.

15. The connector interface tool according to claim 14, wherein the gripping carriage keyway comprises a narrow keyway portion and a wide keyway portion, and wherein the key of the carriage adjuster comprises a narrow key portion configured to receive the narrow keyway portion and a wide key portion configured to receive the wide keyway portion.

16. The connector interface tool according to claim 10, wherein the carriage gripping surface includes an interface aligning member extending away therefrom.

17. A connector interface gripping tool comprising:

a body having a back pad, a first arm having a bore therethrough extending from the back pad, and a second arm extending from the back pad in the same direction as the first arm, the second arm being spaced apart from the first arm and having a substantially flat and tapered body gripping surface at a free end of the second arm;

a carriage adjuster having at least a portion extending through the bore in the first arm and movable relative to the first arm, the carriage adjuster having a key at a first end; and a gripping carriage including a substantially flat and tapered carriage gripping surface, the gripping carriage being coupled to the key of the carriage adjuster such that the gripping carriage is movable relative to the carriage adjuster and such that the carriage adjuster can move the gripping carriage between a loading position and a gripping position, wherein when the gripping carriage is in the loading position there is a gap between the carriage gripping surface and the body gripping surface, and when the gripping carriage is in the gripping position the taper of the carriage gripping surface is configured to align with the taper of the body gripping surface.

18. The connector interface tool according to claim 17, wherein the first arm includes at least one stabilizing leg extending from an exterior surface of the first arm.

19. The connector interface tool according to claim 17, wherein the carriage adjuster comprises an eye stem having an eye, the key and a threaded portion between the eye and the key.

20. The connector interface tool according to claim 17, wherein the gripping carriage comprises a keyway configured and dimensioned to receive the key of the carriage adjuster to couple the gripping carriage to the carriage adjuster.

21. The connector interface tool according to claim 20, wherein the gripping carriage keyway comprises a narrow keyway portion and a wide keyway portion, and wherein the key of the carriage adjuster comprises a narrow key portion configured to receive the narrow keyway portion and a wide key portion configured to receive the wide keyway portion.

22. The connector interface tool according to claim 21, wherein the gripping carriage comprises at least one plug positioned in the wide keyway portion of the gripping carriage keyway to seal the key of the carriage adjuster within the gripping carriage keyway.

23. The connector interface tool according to claim 17, wherein the carriage gripping surface includes an interface aligning member extending away therefrom.

* * * * *